(No Model.)

W. T. J. LOWE.
SPOON BAIT FOR FISHING.

No. 276,055. Patented Apr. 17, 1883.

Witnesses:
Otto Hoddick.
Wm. W. Kent.

Inventor.
William T. J. Lowe
By W. T. Miller
Atty

UNITED STATES PATENT OFFICE.

WILLIAM T. J. LOWE, OF BUFFALO, NEW YORK.

SPOON-BAIT FOR FISHING.

SPECIFICATION forming part of Letters Patent No. 276,055, dated April 17, 1883.

Application filed February 19, 1883. (No model.)

*To all whom it may concern:*

Be it known that I, WILLIAM T. J. LOWE, a citizen of the United States, residing at Buffalo, in the county of Erie and State of New York, have invented certain new and useful Improvements in Spoon-Bait for Fishing; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates more particularly to certain improvements in spoon-bait for fishing for which Letters Patent No. 256,843 were granted me the 25th of April, 1882. I have found in practice that the spoon arranged as shown and described in the above-named patent is liable, in rapid trolling, or when the spoon is drawn through the water against a strong current, to spread too far for advantageous results, and remain so until the wire spring is bent into shape again by hand. This is a serious objection to the perfect working of the spoon-bait; and the object of my present invention is to overcome this difficulty. To this end I have taken my spoon-bait, as shown in my previous patent, and applied thereto a link loosely pivoted at both ends, which connects the spoon with the rod or wire upon which it revolves in such a manner as to limit its outward movement without disturbing in any degree its free revolution in the water.

I will now proceed to particularly describe and claim the manner in which I have carried out my invention.

Figure 1:
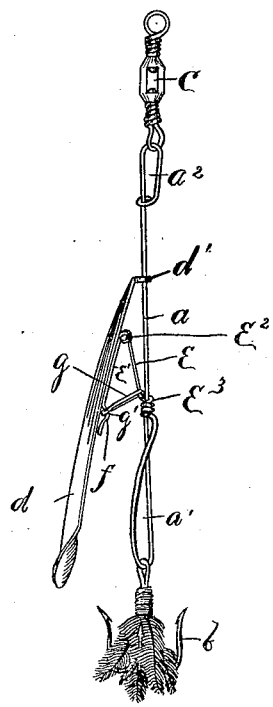
Figure 2:
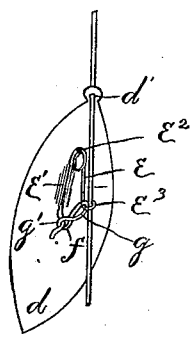
Figure 3:
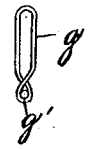

In the drawings, Figure 1 is a view of my spoon-bait with the improvement applied thereto. Fig. 2 is a detached view of the spoon, spring, and connecting-link; and Fig. 3 is a view of the connecting-link.

Referring to the drawings, $a$ is the rod or wire upon which the spoon revolves, provided with the usual loops, $a'$ and $a^2$.

$b$ is the hook, attached to the loop $a'$; and $c$ is the swivel, attached to the loop $a^2$.

$d$ is the spoon, provided with the eye $d'$, which loosely encircles the rod or wire $a$.

$e$ is the spring, having one end, $e'$, rigidly secured by solder or otherwise to the spoon $d$, near the top thereof, and upon its inner surface. The spring $e$ is formed at $e^2$ into one or more spiral turns to give it the requisite degree of elasticity. The other end of spring $e$ is formed into an eye, $e^3$, which, like the eye $d'$ of the spoon, loosely encircles the rod or wire $a$.

The construction thus far described is the same as in my previous patent hereinbefore referred to, and to which the improvement which forms the subject-matter of my invention is applied in the following manner: The portion $e'$ of the spring $e$ is made longer than before, and its lower end is formed with the loop or bend $f$, which rests against the surface of the spoon $d$. The outer end of this bend, for convenience in inserting the link to be hereinafter described, is preferably left unattached to the surface of the spoon, although it could be secured by solder or otherwise to the spoon after the insertion of the link in the bend $f$.

$g$ is the connecting-link, which has the small eye $g'$ at one end thereof. This eye may be made by giving the end of the link $g$ one or more turns at its end, as clearly shown in Fig. 3. In applying this link $g$ to the spring $e$ its eye $g'$ is first inserted in the loop or bend $f$, where it is securely and removably held by the spring action of the bend $f$ against the spoon; or the outer end of said bend $f$ may be soldered to the spoon after the insertion of the eye $g'$ of the link $g$. I prefer the former construction, as it more readily permits of the insertion of a fresh link when required. The eye $e^3$ of the spring $e$ is then easily passed through the larger portion of the link $g$, when the spoon, spring, and connecting-link are ready for the reception of the rod or wire in the completion of the spoon-bait. It will be seen that by this improved construction the spoon is prevented from spreading too far in an outward direction and remaining in such position, thus entirely obviating the difficulty heretofore mentioned, which was experienced in the operation of the form of bait covered by my previous patent. The eye $g'$ prevents the link from sliding in the bend, and thereby locking the spoon so that its free movements to and from the rod or wire $a$ are prevented.

I claim—

1. In a spoon-bait for fishing, in combination, the spoon $d$, provided with the eye $d'$ at its upper end, and the loop or bend $f$ upon its inner surface, the spring $e$, located near the top of the spoon, as shown, and provided with the eye $e^3$, and a connecting-link loosely pivoted at one end in the loop or bend $f$, and loosely encircling at its other end the outer portion of the spring $e$, as and for the purpose stated.

2. In combination, the rod or wire $a$, the spoon $d$, provided with the eye $d'$ at its upper end, and the spring loop or bend $f$ upon its inner surface, the spring provided with the eye $e^3$, and connecting-link $g$, having the eye $g'$, as and for the purpose stated.

In testimony whereof I have signed my name to this specification in the presence of two subscribing witnesses.

WILLIAM T. J. LOWE.

Witnesses:
W. T. MILLER,
OTTO HODDICK.